US005541865A

United States Patent [19]
Ashkenazi

[11] Patent Number: 5,541,865
[45] Date of Patent: Jul. 30, 1996

[54] METHOD AND APPARATUS FOR PERFORMING A POPULATION COUNT OPERATION

[75] Inventor: Yaron Ashkenazi, Haifa, Israel

[73] Assignee: Intel Corporation, Santa Clara, Calif.

[21] Appl. No.: 499,095

[22] Filed: Jul. 6, 1995

Related U.S. Application Data

[63] Continuation of Ser. No. 175,783, Dec. 30, 1993, abandoned.

[51] Int. Cl.$^6$ .................................................. G06F 7/50
[52] U.S. Cl. ............................... 364/715.09; 364/784
[58] Field of Search .......................... 364/715.09, 784, 364/786, 758

[56] References Cited

U.S. PATENT DOCUMENTS

| | | | |
|---|---|---|---|
| 3,711,692 | 1/1973 | Batcher | 364/715.09 |
| 3,723,715 | 3/1973 | Chen et al. | 364/715.09 |
| 4,161,784 | 1/1978 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 364/715.09 |
| 4,707,800 | 11/1987 | Montrone et al. | 364/788 |
| 4,771,379 | 9/1988 | Ando et al. | 364/200 |
| 4,989,168 | 1/1991 | Kuroda et al. | 364/715.09 |
| 5,095,457 | 3/1992 | Jeong | 364/715.09 |
| 5,187,679 | 2/1993 | Vassiliadis et al. | 364/715.09 |
| 5,339,447 | 8/1994 | Balmer | 364/715.09 |
| 5,418,736 | 5/1995 | Widigen et al. | 364/786 |

OTHER PUBLICATIONS

Motorola MC88110 Second Generation RISC Microprocessor User's Manual, Motorola, Inc., Table of Contents (9 pgs.).
Motorola Semiconductor Technical Data, Errata to MC88110 Second Generation RISC Microprocessor User's Manual, Motorola, Inc., pp. 1–11.
Titled "MC88110 Second Generation RISC Microprocessor User's Manual" Sep. 1992, pp. 1–23, 2–1 to 2–20, 3–1 to 3–32, 5–1 to 5–25, 10–62 to 10–71, Index 1 to 17.
Motorola Semiconductor Technical Data Titled "MC88110 Programmer's Reference Guide", Dec. 1992, pp. 1–4.
Titled "Intel i 750®, i860™, i960® Processors and Related Products", 1993, Table of Contents & p. xii.
J. Shipnes, *Graphics Processing with the 88110 RISC Microprocessor,* IEEE (1992), pp. 169–174.
*MC88110 Second Generation RISC Microprocessor User's Manual,* Motorola Inc. (1991).
*MC88110 Programmer's Reference Guide,* Motorola Inc. (1992), pp. 1–4.
*i860™ Microprocessor Family Programmer's Reference Manual,* Intel Corporation (1992), Ch. 1, 3, 8, 12.
R. B. Lee, *Accelerating Multimedia With Enhanced Microprocessors,* IEEE Micro (Apr. 1995), pp. 22–32.
TMS320C2x User's Guide, Texas Instruments (1993) pp. 3–2 through 3–11; 3–28 through 3–34; 4–1 through 4–22; 4–41; 4–103; 4–199 through 4–120; 4–150 through 4–151.
L. Gwennap, *New PA–RISC Processor Decodes MPEG Video,* Microprocessor Report (Jan. 1994), pp. 16, 17.
SPARC Technology Business, *UltraSPARC Multimedia Capabilities On–Chip Support for Real–Time Video and Advanced Graphics,* Sun Microsystems (Sep. 1994).

(List continued on next page.)

*Primary Examiner*—David H. Malzahn
*Attorney, Agent, or Firm*—Blakely, Sokoloff, Taylor & Zafman

[57] ABSTRACT

An operation circuit for performing a population count. The operation circuit comprises a first circuit being coupled to receive a first data element. A first packed data includes the first data element and a second data element. Each of the data elements has a predetermined number of bits. The first circuit is for generating a first result data element representing a total number of bits set in the first data element. The operation circuit further comprises a second circuit being coupled to receive the second data element. The second circuit is for generating a second result data element representing a total number of bits set in the second data element.

5 Claims, 16 Drawing Sheets

OTHER PUBLICATIONS

Y. Kawakami et al., *LSI Applications: A Single–Chip Digital Signal Processor for Voiceband Applications,* Solid State Circuits Conference, Digest of Technical Papers; IEEE International (1980) pp. 40–41.

B. Case, *Philips Hopes to Displace DSPs with VLIW,* Microprocessor Report (Dec. 94), pp. 12–18.

N. Margulis, *i860 Microprocessor Architecture,* Mc Graw Hill, Inc. (1990) Ch. 6, 7, 8, 10, 11.

*Pentium Processor User's Manual, vol. 3: Architecture and Programming Manual,* Intel Corporation (1993), Chapters 1, 3, 4, 6, 8, and 18.

63   1615   0

| 000----------- | wwww wwww wwww wwww |

Unsigned Word In-register Representation 412

63   1615   0

| sss----------- | swww wwww wwww wwww |

Signed Word In-register Representation 413

Figure 4c

```
63          32 31                                0
┌────────────┬──────────────────────────────────┐
│000─────────│dddd dddd dddd dddd dddd dddd dddd│
└────────────┴──────────────────────────────────┘
```

Unsigned Doubleword In-register Representation 414

```
63          32 31                                0
┌────────────┬──────────────────────────────────┐
│sss─────────│sddd dddd dddd dddd dddd dddd dddd│
└────────────┴──────────────────────────────────┘
```

Signed Doubleword In-register Representation 415

Figure 4d

Packed Byte Data Type 501

| 63 | 56 55 | 48 47 | 40 39 | 32 31 | 24 23 | 16 15 | 8 7 | 0 |
|---|---|---|---|---|---|---|---|---|
| Byte 7 | Byte 6 | Byte 5 | Byte 4 | Byte 3 | Byte 2 | Byte 1 | Byte 0 |

Packed Word Data Type 502

| 63 | 48 47 | 32 31 | 16 15 | 0 |
|---|---|---|---|---|
| Word 3 | Word 2 | Word 1 | Word 0 |

Packed DoubleWord Data Type 503

| 63 | 32 31 | 0 |
|---|---|---|
| DoubleWord 1 | DoubleWord 0 |

Figure 5a

| 63 | 56 55 | 48 47 | 40 39 | 32 31 | 24 23 | 16 15 | 8 7 | 0 |
|---|---|---|---|---|---|---|---|---|
| bbbb bbbb | bbbb bbbb | bbbb bbbb | bbbb bbbb | bbbb bbbb | bbbb bbbb | bbbb bbbb | bbbb bbbb | |

Unsigned Packed Byte In-register Representation 510

| 63 | 56 55 | 48 47 | 40 39 | 32 31 | 24 23 | 16 15 | 8 7 | 0 |
|---|---|---|---|---|---|---|---|---|
| sbbb bbbb | sbbb bbbb | sbbb bbbb | sbbb bbbb | sbbb bbbb | sbbb bbbb | sbbb bbbb | sbbb bbbb | |

Signed Packed Byte In-register Representation 511

Figure 5b

Unsigned Packed Word In-register Representation 512

Signed Packed Word In-register Representation 513

Figure 5c dddd dddd dddd dddd | dddd dddd dddd dddd
63                32 31                    0

Unsigned Packed Doubleword In-register Representation 514 sddd dddd dddd dddd | sddd dddd dddd dddd
63                32 31                    0

Signed Packed Doubleword In-register Representation 515

Figure 5d

METHOD AND APPARATUS FOR PERFORMING A POPULATION COUNT OPERATION

This is a continuation of application Ser. No. 08/175,783, filed Dec. 30, 1993 now abandoned.

BACKGROUND OF THE INVENTION

1. Field of Invention

The present invention relates to the field of processor operation. In particular, the present invention describes an apparatus and method of performing a population count operation on packed data.

2. Description of Related Art

Today, most personal computer systems operate with one instruction to produce one result. Performance increases are achieved by increasing execution speed of instructions and the processor instruction complexity; known as Complex Instruction Set Computer (CISC). Such processors as the Intel 80486™ microprocessor, available from Intel Corp. of Santa Clara, Calif., belong to the CISC category of processor.

Previous computer system architecture has been optimized to take advantage of the CISC concept. Such systems typically have data buses thirty-two bits wide. However, applications targeted at computer supported cooperation (CSC—the integration of teleconferencing with mixed media data manipulation), 2D/3D graphics, image processing, video compression/decompression, recognition algorithms and audio manipulation increase the need for improved performance. But, increasing the execution speed and complexity of instructions is only one solution.

One common aspect of these applications is that they often manipulate large amounts of data where only a few bits are important. That is, data whose relevant bits are represented in much fewer bits than the size of the data bus. For example, processors execute many operations on eight bit and sixteen bit data (e.g., pixel color components in a video image). Thus, a processor having a thirty-two bit data bus and registers, and executing one of these algorithms, can waste up to seventy-five percent of its data processing, carrying and storage capacity because only the first eight bits of data are important.

As such, what is desired is a processor that increases performance by more efficiently using the difference between the number of bits required to represent the data to be manipulated and the actual data carrying and storage capacity of the processor.

SUMMARY OF THE INVENTION

An apparatus and method of increasing processor performance by efficiently reducing the difference between data element length and actual carrying and storage capacity is described. In one embodiment, a circuit performs population count operations on packed data. This embodiment accelerates the operation of multimedia applications by providing the result of a population count operation on a packed data within one clock cycle of the system using the circuit.

A first embodiment of the present invention includes an operation circuit for performing a population count. The operation circuit comprises a first circuit being coupled to receive a first data element. A first packed data includes the first data element and a second data element. Each of the data elements has a predetermined number of bits. The first circuit is for generating a first result data element representing a total number of bits set in the first data element. The operation circuit further comprises a second circuit being coupled to receive the second data element. The second circuit is for generating a second result data element representing a total number of bits set in the second data element.

In another embodiment of the present invention, the operation circuit generates a result packed data, and the result packed data includes the first result data element and the second result data element.

In another embodiment of the present invention, the first packed data includes a third data element and a fourth data element. The operation circuit further comprises third and fourth circuits. The third circuit is coupled to receive the third data element. The third circuit is for generating a third result data element representing a total number of bits set in the third data element. The fourth circuit is coupled to receive the fourth data element. The fourth circuit is for generating a fourth result data element representing a total number of bits set in the fourth data element.

In another embodiment of the present invention, packed data includes sixty-four bits, and each of the data elements includes sixteen bits.

In another embodiment of the present invention, the first circuit includes seven carry-save adders and a full adder. A first carry-save adder is coupled to receive bit three through bit zero of the first packed data. The first carry-save adder is for generating a first two-bit output and a second two-bit output. A second carry-save adder is coupled to receive bit seven through bit four of the first packed data. The second carry-save adder is for generating a third two-bit output and a fourth two-bit output. A third carry-save adder is coupled to receive bit eleven through bit eight of the first packed data. The third carry-save adder is for generating a fifth two-bit output and a sixth two-bit output. The fourth carry-save adder is coupled to receive bit fifteen through bit twelve of the first packed data. The fourth carry-save adder is for generating a seventh two-bit output and an eight two-bit output. A fifth carry-save adder is coupled to receive the first, second, third and fourth two-bit outputs. The fifth carry-save adder is for generating a first three-bit output and a second three-bit output. A sixth carry-save adder is coupled to receive the fifth, sixth, seventh, and eight two-bit outputs. The sixth carry-save adder is for generating a third three-bit output and a fourth three-bit output. A seventh carry-save adder is coupled to receive the first, second, third, and fourth three-bit outputs, and the seventh carry-save adder is for generating a first four-bit output and a second four-bit output. The full adder is coupled to receive the first and second four-bit outputs, the full adder is for generating bit four through bit zero of the result packed data, and the bit fifteen through bit five of the result packed data is coupled to ground.

In another embodiment of the present invention, each of the carry-save adders is a 4→2 carry-save adder.

In another embodiment of the present invention, the full adder is a four-bit full adder. The full adder is for generating a carry-out, and the full adder is for generating bit four of the result packed data.

In another embodiment of the present invention, a bit is set if that bit equals one.

Thus, in a single operation, multiple data elements may be operated upon given a single packed data.

An object of the present invention is to provide a circuit better suited to multimedia applications.

An object of the present invention is to improve the execution of multimedia algorithms by more efficiently using the difference between the length of data element manipulated and the actual data carrying and storage capacity of the processor.

An object of the present invention is to allow one operation to perform work on multiple data elements.

An object of the present invention is to improve the performance algorithms requiting the totaling of the number of bits set in a eight bit, sixteen bit, and thirty-two bit operations in a processor having sixty-four bit registers.

An object of the present invention is to efficiently support population count operations on eight bit, sixteen bit, and thirty-two bit data elements in a processor having sixty-four bit registers.

An object of the present invention is to perform a population count operation on a packed data within one clock cycle.

Although a great deal of detail has been included in the description and figures, our invention is defined by the scope of the claims. Only limitations found in those claims apply to our invention.

BRIEF DESCRIPTION OF THE DRAWINGS

The present invention is illustrated by way of example, and not limitation, in the figures. Like references indicate similar elements.

FIG. 4b through FIG. 4d illustrate in-register integer data representations.

FIG. 5a illustrates packed data-types.

FIG. 5b through FIG. 5d illustrate in-register packed data representations.

DESCRIPTION OF THE PREFERRED EMBODIMENT

DEFINITIONS

To provide a foundation for understanding the description of the embodiments of the present invention, the following definitions are provided.

Bit X through Bit Y: defines a subfield of binary number. For example, bit six through bit zero of the byte $00111010_2$ (shown in base two) represent the subfield $111010_2$. The '$_2$' following a binary number indicates base 2. Therefore, $1000_2$ equals $8_{10}$, while $F_{16}$ equals $15_{10}$.

$R_x$: is a register. A register is any device capable of storing and providing data. Further functionality of a register is described below.

DEST: is an address of a register.

SRC1: is an address of a register.

SRC2: is an address of a register.

Result: is the data to be stored in the register addressed by DEST.

Source1: is the data stored in the register addressed by SRC1.

Source2: is the data stored in the register addressed by SRC2.

COMPUTER SYSTEM

An apparatus and method of increasing processor performance by efficiently reducing the difference between data element length and actual carrying and storage capacity is described. In the following description, numerous specific details are set forth such as packed data formats, control signal formats, etc., in order to provide a thorough understanding of the present invention. It will be obvious, however, to one skilled in the art that the present invention may be practiced without these specific details. In other instances, well-known processor architecture, circuits, structures and techniques have not been shown in detail in order not to unnecessarily obscure the present invention.

Figure 1:
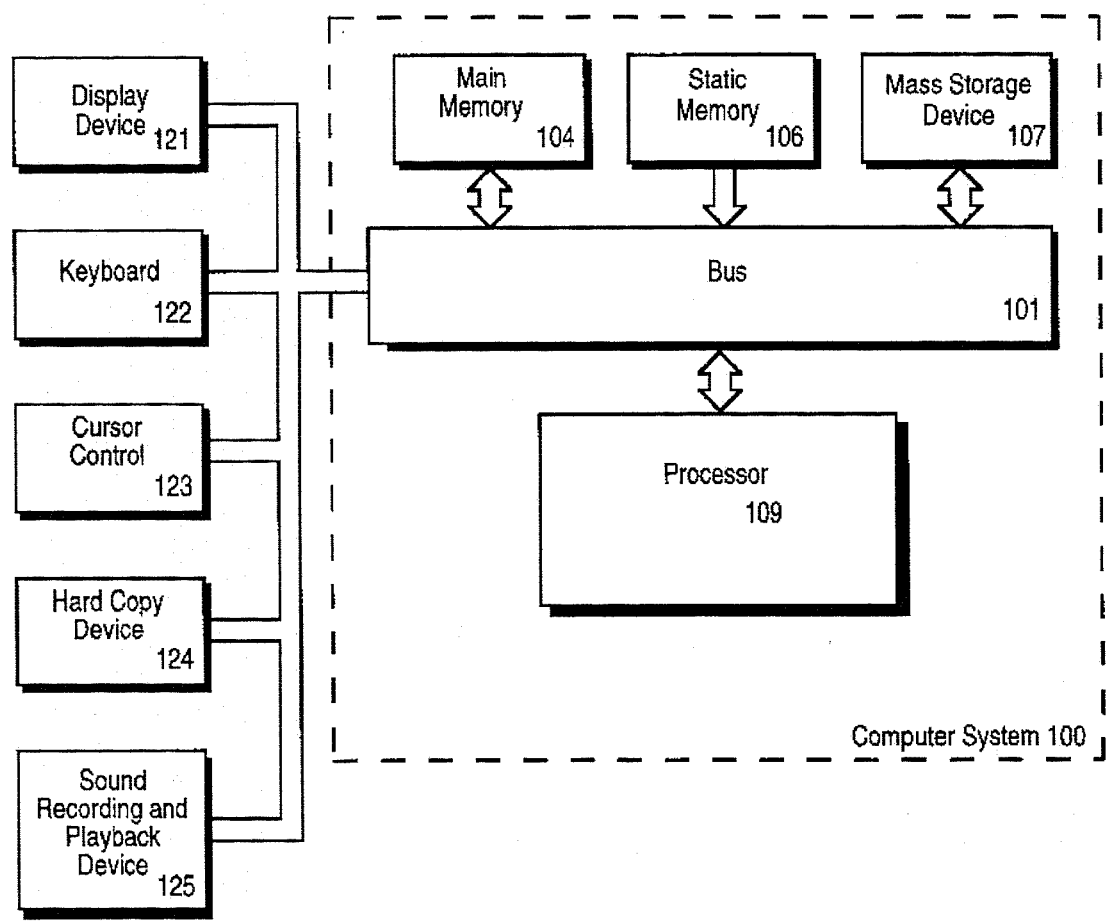
FIG. 1 illustrates an embodiment of the computer system using the methods and apparatus of the present invention.

FIG. 1 illustrates a computer system 100 upon which one embodiment of the present invention can be implemented. Computer system 100 comprises a bus or other communication means 101 for communicating information, and a processing means 109 coupled with bus 101 for processing information. Computer System 100 further comprises a random access memory (RAM) or other dynamic storage device 104 (referred to as main memory), coupled to bus 101 for storing information and instructions to be executed by processor 109. Main memory 104 also may be used for storing temporary variables or other intermediate information during execution of instructions by processor 109. Computer system 100 also comprises a read only memory (ROM) and/or other static storage device 106 coupled to bus 101 for storing static data and instructions for processor 109. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 109. Another type of user input device is cursor control 123, such as a mouse, a trackball, or cursor direction keys for communicating direction information and command selections to processor 109 and for controlling cursor movement on display 121. This input device typically has two degrees of freedom in two axes, a first axis (e.g., x) and a second axis (e.g., y), which allows the device to specify positions in a plane.

Another device that may be coupled to bus 101 is hard copy device 124 that may be used for printing instructions, data, or other information on a medium such as paper, film, or similar types of media. Additionally, computer system 100 can be coupled to a device for sound recording and/or playback 125 such as an audio digitizer coupled to a microphone for recording information. Further, the device may include a speaker that is coupled to a digital to analog (D/A) converter for playing back the digitized sounds. Finally, computer system 100 can be a terminal in a computer network (e.g., a LAN).

Computer system 100 is useful for supporting computer supported conferencing (CSC—the integration of teleconferencing with mixed media data manipulation), 2D/3D graphics, image processing, video compression/decompression, recognition algorithms and audio manipulation.

PROCESSOR

Figure 2:
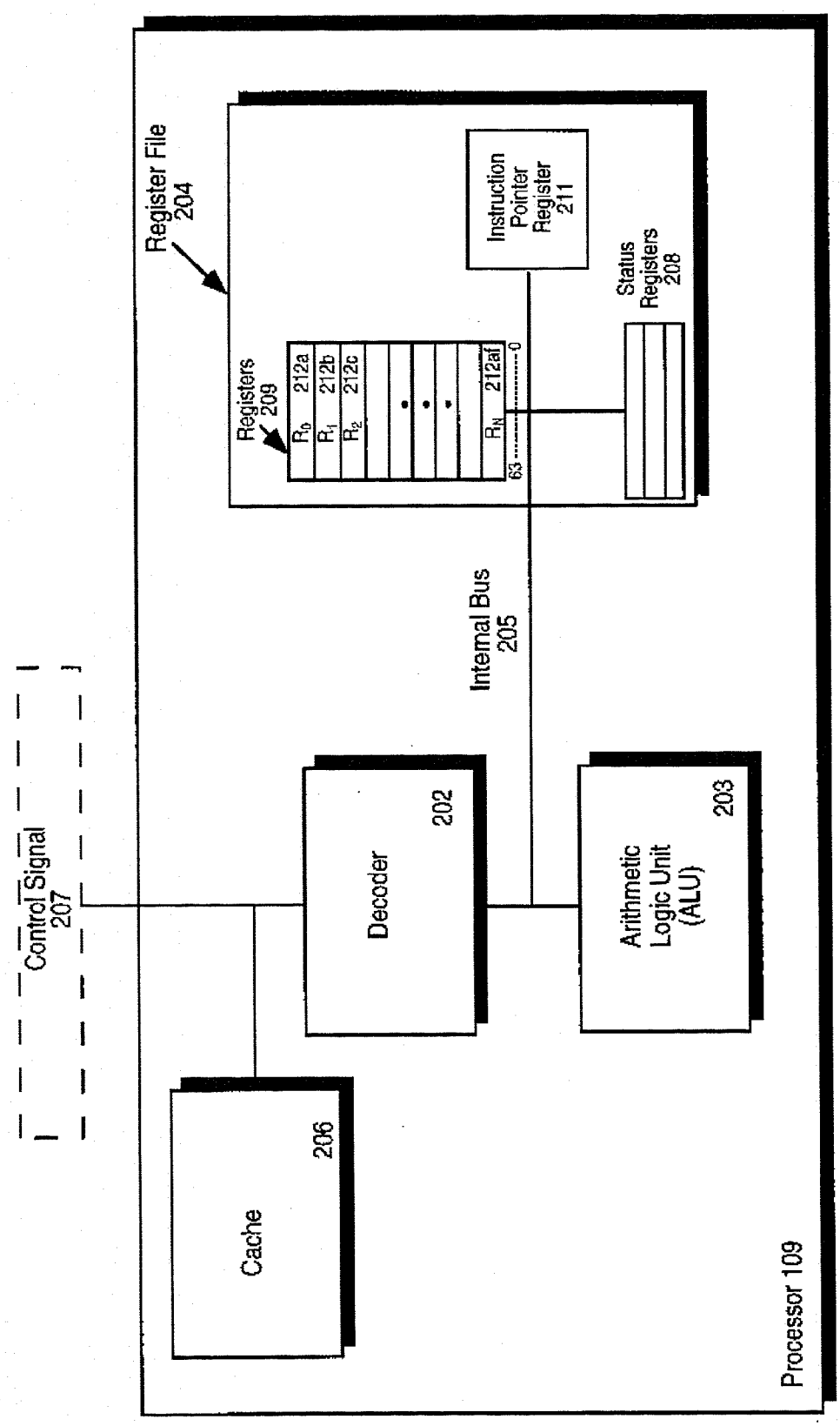
FIG. 2 illustrates an embodiment of the processor of the present invention.

FIG. 2 illustrates a detailed diagram of processor 109. One skilled in the art would understand that processor 109 could be implemented on one or more substrates using any of a number of process technologies, such as, BiCMOS, CMOS, and NMOS.

Processor 109 comprises a decoder 202 for decoding control signals and data used by processor 109. Data can then be stored in register file 204 via internal bus 205. As a matter of clarity, the registers of the preferred embodiment should not be limited in meaning to a particular type of circuit. Rather, a register of the preferred embodiment need only be capable of storing and providing data, and performing the functions described herein.

Depending on the type of data, the data may be stored in integer registers 209, status registers 208, or instruction pointer register 211. Integer registers 209 contains thirty-two integer registers, $R_1$ 212a through $R_n$ 212af. Each register is sixty-four bits in length. $R_1$ 212a, $R_2$ 212b and $R_3$ 212c are examples of individual registers in integer registers 209. Status registers 208 indicate the status of processor 109. Instruction pointer register 211 stores the address of the next instruction to be executed. Integer registers 209, status registers 208, and instruction pointer register 211 all connect to internal bus 205.

Arithmetic logic unit 203 (ALU) performs the arithmetic and logic operations carded out by processor 109. Such operations may include logical shifts, addition, subtraction and multiplication, etc. ALU 203 connects to internal bus 205. Cache 206 is an optional element of processor 109 and can be used to cache data, including control signals, from, for example, main memory 104. Cache 206 is connected to decoder 202, and is connected to receive control signal 207.

Figure 3:
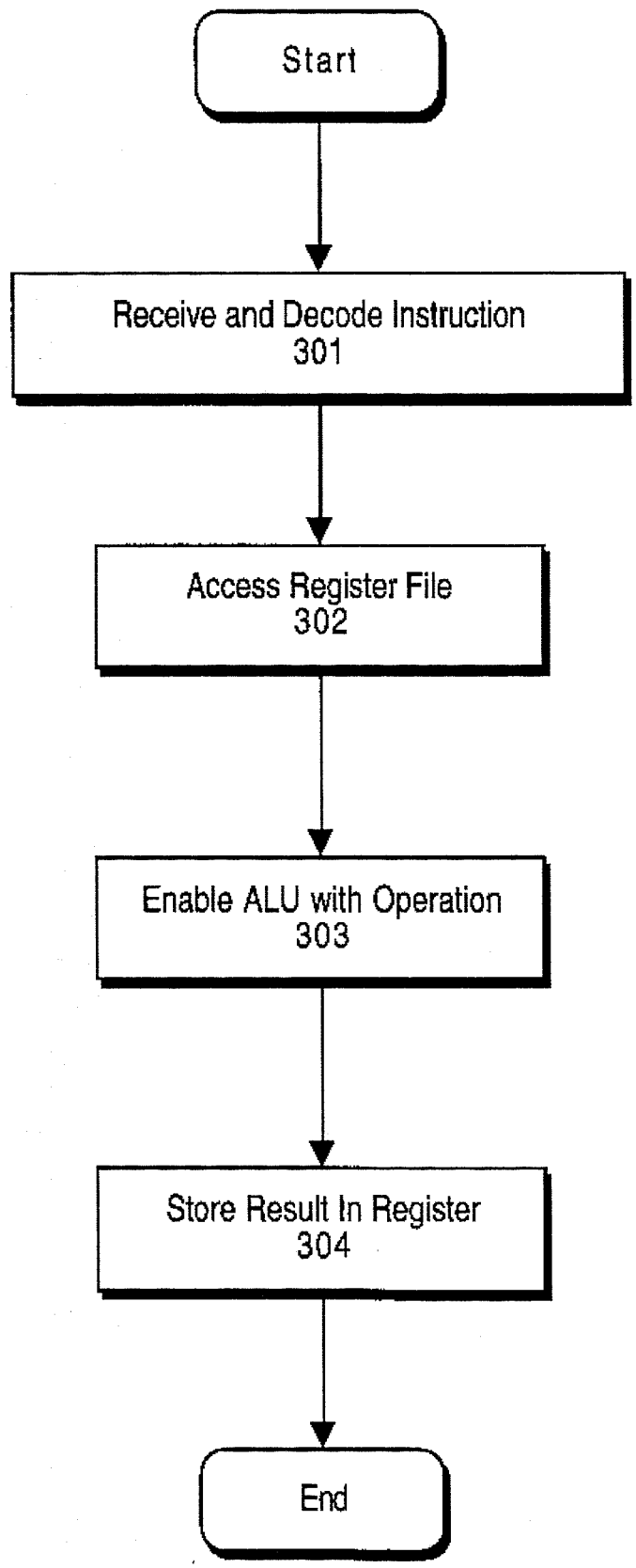
FIG. 3 is a flow diagram illustrating the general steps used by the processor to manipulate data in the register file.

FIG. 3 illustrates the general operation of processor 109. That is, FIG. 3 illustrates the steps followed by processor 109 while performing an operation on packed data, performing an operation on unpacked data, or performing some other operation. For example, such operations include a load operation to load a register in register file 204 with data from cache 206, main memory 104, static memory 106, or mass storage device 107. In one embodiment of the present invention, processor 109 supports most of the instructions supported by the Intel 80486™, available from Intel Corporation of Santa Clara, Calif. In another embodiment of the present invention, processor 109 supports all the operations supported by the Intel 80486™, available from Intel Corporation of Santa Clara, Calif. In another embodiment of the present invention, processor 109 supports all the operations supported by the Pentium™, the Intel 80486™, the 80386™, the Intel 80286™, and the Intel 8086™, all available from Intel Corporation of Santa Clara, Calif. In another embodiment of the present invention, processor 109 supports all the operations supported in the IA™—Intel Architecture, as defined by Intel Corporation of Santa Clara, Calif. (see Microprocessors, Intel Data Books volume 1 and volume 2, 1992 and 1993, available from Intel of Santa Clara, Calif.).

At block 301, the decoder 202 receives a control signal 207 from either the cache 206 or bus 101. Decoder 202 decodes the control signal to determine the operations to be performed.

Decoder 202 accesses the register file 204 at block 302. Registers in the register file 204 are accessed depending on the register address specified in the control signal 207. For example, for an operation on packed data, control signal 207 includes SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. SRC1, SRC2 and DEST are described more fully in relation to FIG. 6. The data stored in these registers is referred to as Source1, Source2, and Result respectively. Each of these data is sixty-four bits in length.

Where the control signal requires an arithmetic or logic operation, at step 303, ALU 203 will be enabled to perform this operation on accessed data from register file 204. Once the arithmetic or logic operation has been performed in ALU 203, at step 304, the result is stored back into register file 204 according to requirements of control signal 207.

DATA AND STORAGE FORMATS

Figure 4A:
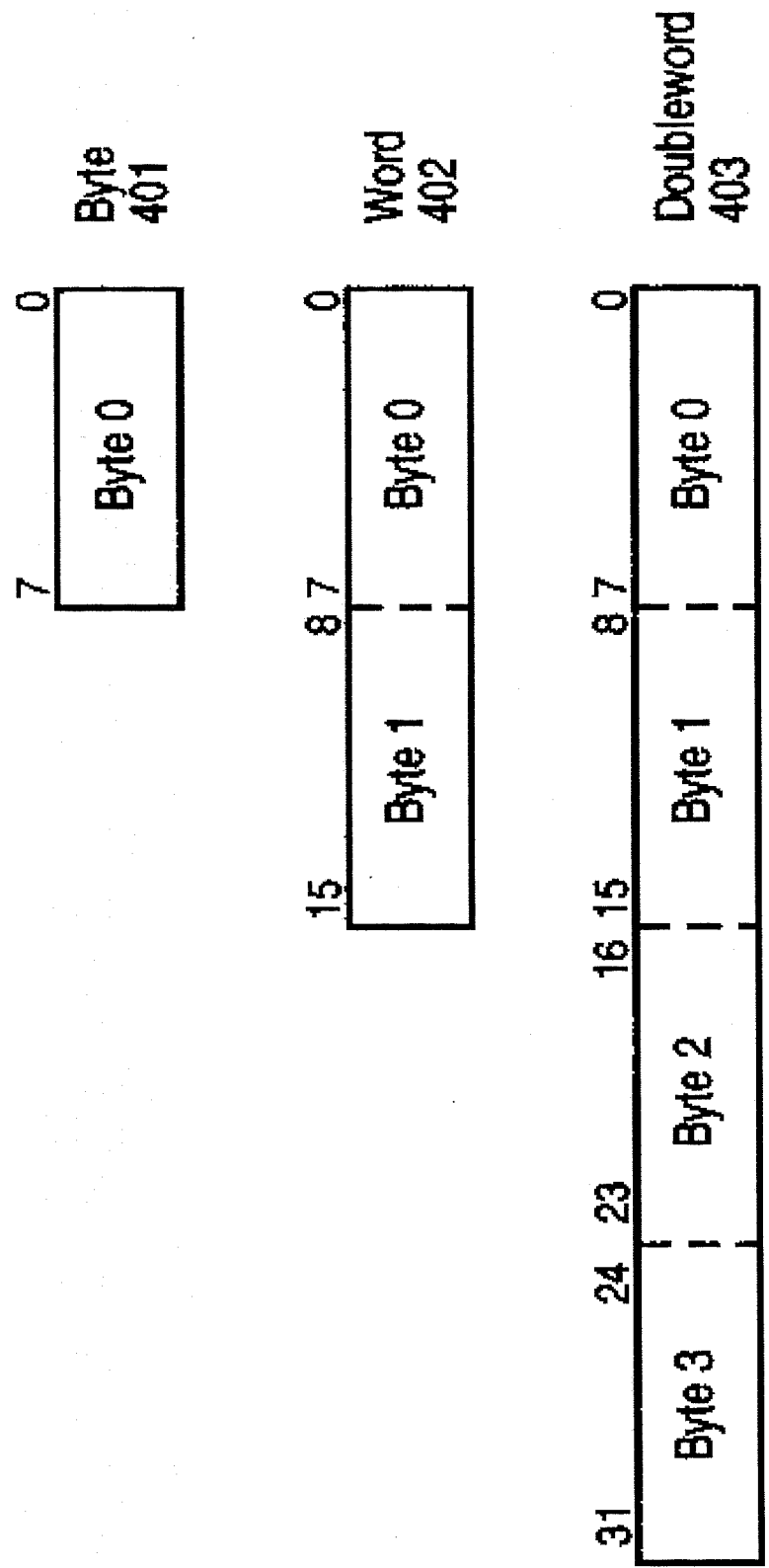
FIG. 4a illustrates memory data types.

FIG. 4a illustrates some of the data formats as may be used in the computer system of FIG. 1. Processor 109 can manipulate these data formats. Multimedia algorithms often use these data formats. A byte 401 contains eight bits of information. A word 402 contains sixteen bits of information, or two bytes. A doubleword 403 contains thirty-two bits of information, or four bytes. Thus, processor 109 executes control signals that may operate on any one of these memory data formats.

In the following description, references to bit, byte, word, and doubleword subfields are made. For example, bit six through bit zero of the byte $00111010_2$ (shown in base 2) represent the subfield $111010_2$.

Figure 4B:
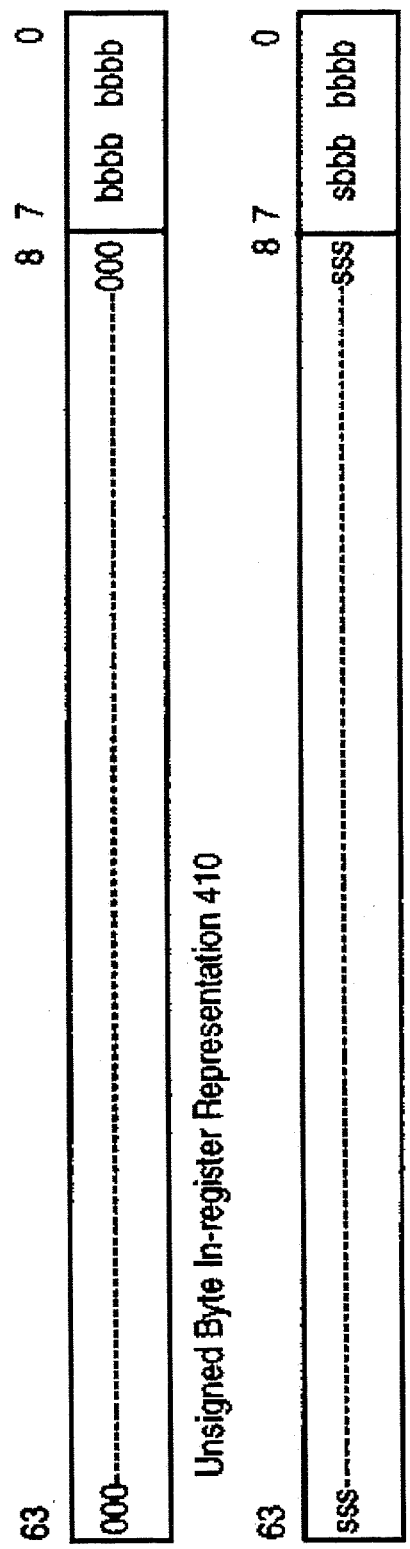

FIG. 4b through FIG. 4d illustrate in-register integer data representations used in one embodiment of the present invention. For example, unsigned byte 403 can represent data stored in integer register $R_1$ 212a. A register, in integer registers 209, is sixty-four bits in length.

In-register unsigned byte representation 410 illustrates processor 109 storing a byte 401 in integer registers 209, the first eight bits, bit seven through bit zero, in that integer register are dedicated to the data byte 401. These bits are shown as {b}. To properly represent this byte, the remaining 56 bits must be zero. For a signed byte 411, integer registers 209 store the data in the first seven bits, bit six through bit zero, to be data. The seventh bit represents the sign bit, shown as an {s}. The remaining bit sixty-three through bit eight are the continuation of the sign for the byte.

Unsigned word in-register data representation 412 is stored in one register of integer registers 209. Bit fifteen through bit zero contain the unsigned word 402. These bits are shown as {w}. To properly represent this word, the remaining bit sixty-three through bit sixteen must be zero. Signed word 402 is stored in bit fourteen through bit zero as shown in the signed word in-register data representation 413. The remaining bit sixty-three through bit fifteen is the sign field.

A doubleword 403 can be stored as an unsigned doubleword or a signed doubled word 414 or 415. Bit thirty-one through bit zero of an unsigned doubleword 414 are the data. These bits are shown as {d}. To properly represent this unsigned doubleword, the remaining bit sixty-three through bit thirty-two must be zero. Integer registers 209 stores a signed doubleword 415 in its bit thirty through bit zero; the remaining bit sixty-three through bit thirty-one are the sign field.

As indicated by the above FIG. 4b through FIG. 4d, storage of some data types in a sixty-four bit wide register is an inefficient method of storage. For example, for storage of an unsigned byte in-register data representation 410 bit sixty-three through bit eight must be zero, while only bit seven through bit zero may contain non-zero bits. Thus, a processor storing a byte in an integer register uses only 12.5% of its capacity. Similarly, only the first few bits of operations performed by ALU 203 will be important.

FIG. 5a illustrates the data formats for packed data. Three packed data formats are illustrated; packed byte data type 501, packed word data type 502, and packed doubleword data type 503. Packed byte, in the preferred embodiment of the present invention, is sixty-four bits long containing eight data elements. Each data element is one byte long. Generally, a data element is an individual piece of data that is stored in a single integer register with other data elements of the same length. In the preferred embodiment of the present invention, the number of data elements stored in an integer register is sixty-four bits divided by the length in bits of a data element.

Packed word data type 502 is sixty-four bits long and contains four word 402 data elements. Each word 402 data element contains sixteen bits of information.

Packed doubleword data type 503 is sixty-four bits long and contains two doubleword data elements. Each doubleword 403 data element 403 contains thirty-two bits of information.

FIG. 5b through FIG. 5d illustrate the in-register packed data storage representation. Unsigned packed byte in-register representation 510 illustrates the storage of packed byte data type 501 in one of the integer registers $R_0$ 212a through $R_n$ 212af. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the integer register. This storage arrangement increases the storage efficiency of the processor. As well, with eight data elements accessed, one operation can now be performed on eight data elements simultaneously. Signed packed byte in-register representation 511 is similarly stored in an integer register in integer registers 209. Note that only the eighth bit of every byte data element is the sign bit; no other bits are used to indicate sign.

Unsigned packed word in-register representation 512 illustrates how word three through word zero are stored in one integer register of integer registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that only the sixteenth bit of each word data element contains the sign indicator.

Unsigned packed doubleword in-register representation 514 shows how integer registers 209 store two doubleword data elements. Doubleword zero is stored in bit thirty-one through bit zero of the integer register. Doubleword one is stored in bit sixty-three through bit thirty-two of the integer register. Signed packed doubleword in-register representation 515 is similar to unsigned packed doubleword in-register representation 514. Note that the signed bit is the thirty-second bit of the doubleword data element.

In one embodiment of the present invention, the individual programming processor 109 must track whether an addressed register, $R_1$ 212a for example, is storing packed data or simple integer data. One skilled in the an would understand that in an alternative embodiment, processor 109 could track the type of data stored in individual registers of integer registers 209. This alternative embodiment could then generate errors if, for example, a packed addition operation were attempted on simple integer data.

CONTROL SIGNAL FORMATS

The following describes the control signal formats used by processor 109 to manipulate packed data. In one embodiment of the present invention, control signals are represented as thirty-two bits. Decoder 202 may receive control signal 207 from bus 101. However, it is obvious to one skilled in the an that decoder 202 can also receive such control signals from cache 206.

Figure 6:
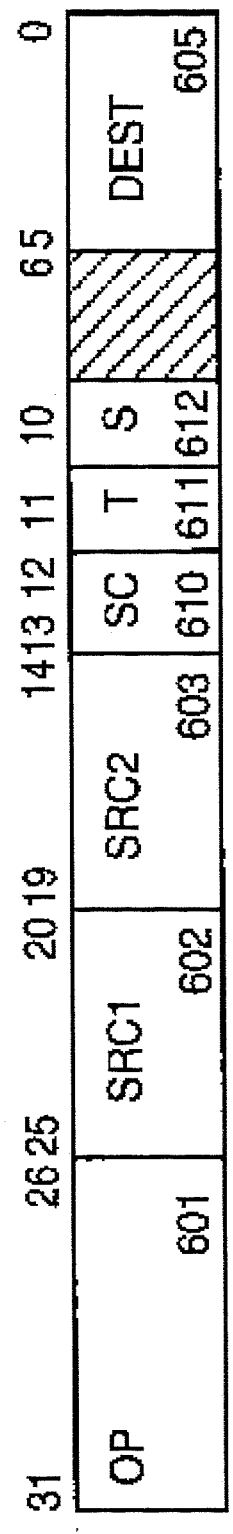
FIG. 6 illustrates the control signal format used in the computer system to indicate the use of packed data.

FIG. 6 illustrates the general format for a control signal operating on packed data. Operation field OP 601, bit thirty-one through bit twenty-six, provides information about the operation to be performed by processor 109; for example, packed addition, packed subtraction, etc.. SRC1 602, bit twenty-five through twenty, provides the source register address of a register in integer registers 209. This source register contains the first packed data, Source1, to be used in the execution of the control signal. Similarly, SRC2 603, bit nineteen through bit fourteen, contains the address of a register in integer registers 209. This second source register contains the packed data, Source2, to be used during execution of the operation. DEST 605, bit five through bit zero, contains the address of a register in integer registers 209. This destination register will store the result packed data, Result, of the packed data operation. Although this general format for a control signal uses source and destination registers in integer registers 209, one skilled in the art would understand that an alternative embodiment can use the source and destination addresses of memory locations in cache 206 or main memory 104.

Control bits SZ 610, bit twelve and bit thirteen, indicates the length of the data elements in the first and second packed data source registers. If SZ 610 equals $01_2$, then the packed data is formatted as packed byte data type 501. If SZ 610 equals $10_2$, then the packed data is formatted as packed word data type 502. SZ 610 equaling $00_2$ or $11_2$ is reserved, however, given the above description, one of ordinary skill in the art would understand that one of these values could be used for doubleword size data type 503.

Control bit T 611, bit eleven, indicates whether the operation is to be carried out with saturate mode. If T 611 equals one, then a saturating operation is performed. If T 611 equals zero, then a nonsaturating operation is performed. Saturating operations will be described later.

Control bit S 612, bit ten, indicates the use of a signed operation. If S 612 equals one, then a signed operation is performed. If S 612 equals zero, then an unsigned operation is performed.

DESCRIPTION OF SATURATE/UNSATURATE

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 1.

TABLE 1

| Data Format | Minimum Value | Maximum Value |
|---|---|---|
| Unsigned Byte | 0 | 255 |
| Signed Byte | −128 | 127 |
| Unsigned Word | 0 | 65535 |
| Signed Word | −32768 | 32767 |
| UnSigned Doubleword | 0 | $2^{64}-1$ |
| Signed Doubleword | $-2^{63}$ | $2^{63}-1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 209 used signed word data format with saturation enabled, then the result would be clamped to −32768 before being stored into the operation's destination register.

POPULATION COUNT

One embodiment of the present invention enables population count operations to be performed on packed data. That is, the present invention generates a result data element for each data element of a first packed data. Each result data element represents the number of bits set in each corresponding data element of the first packed data. In one embodiment, the total number of bits set to one is counted.

Table 2a illustrates an in-register representation of a population count operation on a packed data. The first row of bits is the packed data representation of a Source1 packed data. The second row of bits is the packed data representation of the Result packed data. The number below each data element bit is the data element number. For example, Source1 data element 0 is $1000111110001000_2$. Therefore, if the data elements are sixteen bits in length (word data), and a population count operation is TABLE 2a

| 01110010 00000101 | 11111111 11111111 | 01111111 11111111 | 10001111 10001000 |
|---|---|---|---|
| = 3 | = 2 | = 1 | = 0 |
| 00000000 00000110 | 00000000 00010000 | 00000000 00001111 | 00000000 00000111 |
| 3 | 2 | 1 | 0 |

In another embodiment, population counts are performed on eight bit data elements. Table 2b illustrates an in-register representation of a population count on a packed data having eight eight-bit packed data elements.

TABLE 2b

| 01111111 | 01010101 | 10101010 | 10000001 | 10000000 | 11111111 | 11001111 | 00000000 |
|---|---|---|---|---|---|---|---|
| =7 | =6 | =5 | =4 | =3 | =2 | =1 | =0 |
| 00000111 | 00000100 | 00000100 | 00000010 | 00000001 | 00001000 | 00000110 | 00000000 |
| 7 | 6 | 5 | 4 | 3 | 2 | 1 | 0 |

In another embodiment, population counts are performed on thirty-two bit data elements. Table 2c illustrates an in-register representation of a population count on a packed data having two, thirty-two bit, packed data elements.

That is, integer registers 209 communicate the packed data to ALU 203 via internal bus 205.

TABLE 2c

| 11111111 11111111 11111111 11111111 | 10000000 11110000 11001111 10001000 |
|---|---|
| =1 | =0 |
| 00000000 00000000 00000000 00100000 | 00000000 00000000 00000000 00001101 |
| 1 | 0 |

Population counts can also be performed on sixty-four bit integer data. That is, the number of bits set to one, in sixty-four bits of data, is totalled. Table 2d illustrates an in-register representation of a population count on sixty-four bit integer data.

At step 703, decoder 202 enables ALU 203 to perform a population count operation. In an alternative embodiment, decoder 202 further communicates, via internal bus 205, the length of packed data elements.

TABLE 2d

| 11111111 11111111 11111111 11111111 10000000 11110000 11001111 10001000 |
|---|
| = |
| 00000000 00000000 00000000 00000000 00000000 00000000 00000000 00101101 |

A METHOD OF PERFORMING A POPULATION COUNT

Figure 7:
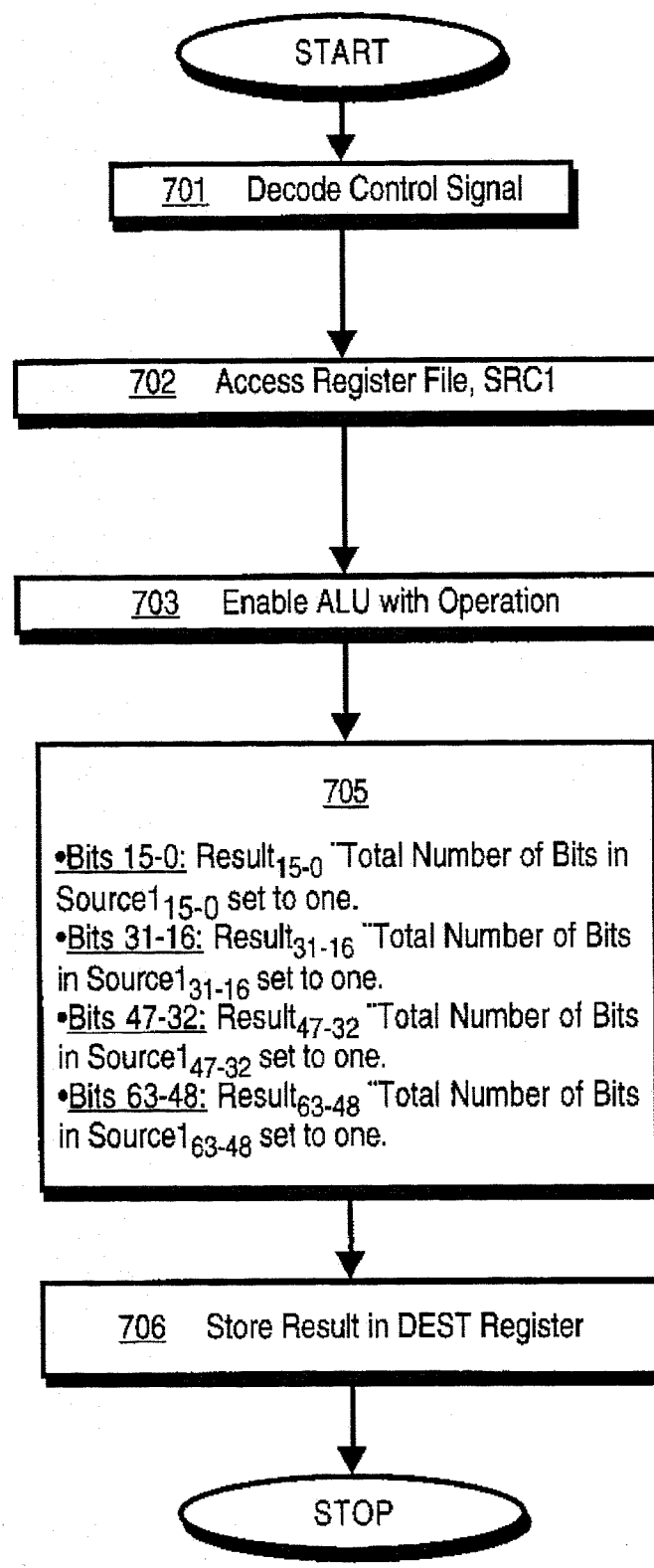
FIG. 7 illustrates the steps followed by a processor when performing a population count operation on packed data.

FIG. 7 illustrates one method of performing a population count operation on packed data. At step 701, responsive to receiving a control signal 207, decoder 202 decodes that control signal 207. In one embodiment, control signal 207 is supplied via bus 101. In another embodiment, control signal 207 is supplied by cache 206. Thus, decoder 202 decodes: the operation code for population count, and SRC1 602 and DEST 605 addresses in integer registers 209. Note that SRC2 603 is not used in this present embodiment of the present invention. As well, saturate/unsaturate, signed/unsigned, and length of the data elements in the packed data are not used in this embodiment. In the present embodiment of the invention, only sixteen bit data element length packed addition is supported. However, one skilled in the art would understand that population counts can be performed on packed data having eight packed byte data elements or two packed doubleword data elements.

At step 702, via internal bus 205, decoder 202 accesses integer registers 209 in register file 204 given the SRC1 602 address. Integer registers 209 provides ALU 203 with the packed data, Source1, stored in the register at this address.

At step 705, assuming the length of the data elements is sixteen bits, then ALU 203 totals the number of bits set in bit fifteen through bit zero of Source1, producing bit fifteen through bit zero of Result packed data. In parallel with this totaling, ALU 203 adds totals thirty-one through bit sixteen of Source1, producing bit thirty-one through bit sixteen of Result packed data. In parallel with the generation of these totals, ALU 203 totals bit forty-seven through bit thirty-two of Source1, producing bit forty-seven through bit thirty-two of Result packed data. In parallel with the generation of these totals, ALU 203 totals bit sixty-three through bit forty-eight of Source1, producing bit sixty-three through bit forty-eight of Result packed data.

At step 706, decoder 202 enables a register in integer registers 209 with DEST 605 address of the destination register. Thus, the Result packed data is stored in the register addressed by DEST 605.

A METHOD OF PERFORMING A POPULATION COUNT ON ONE DATA ELEMENT

Figure 8:
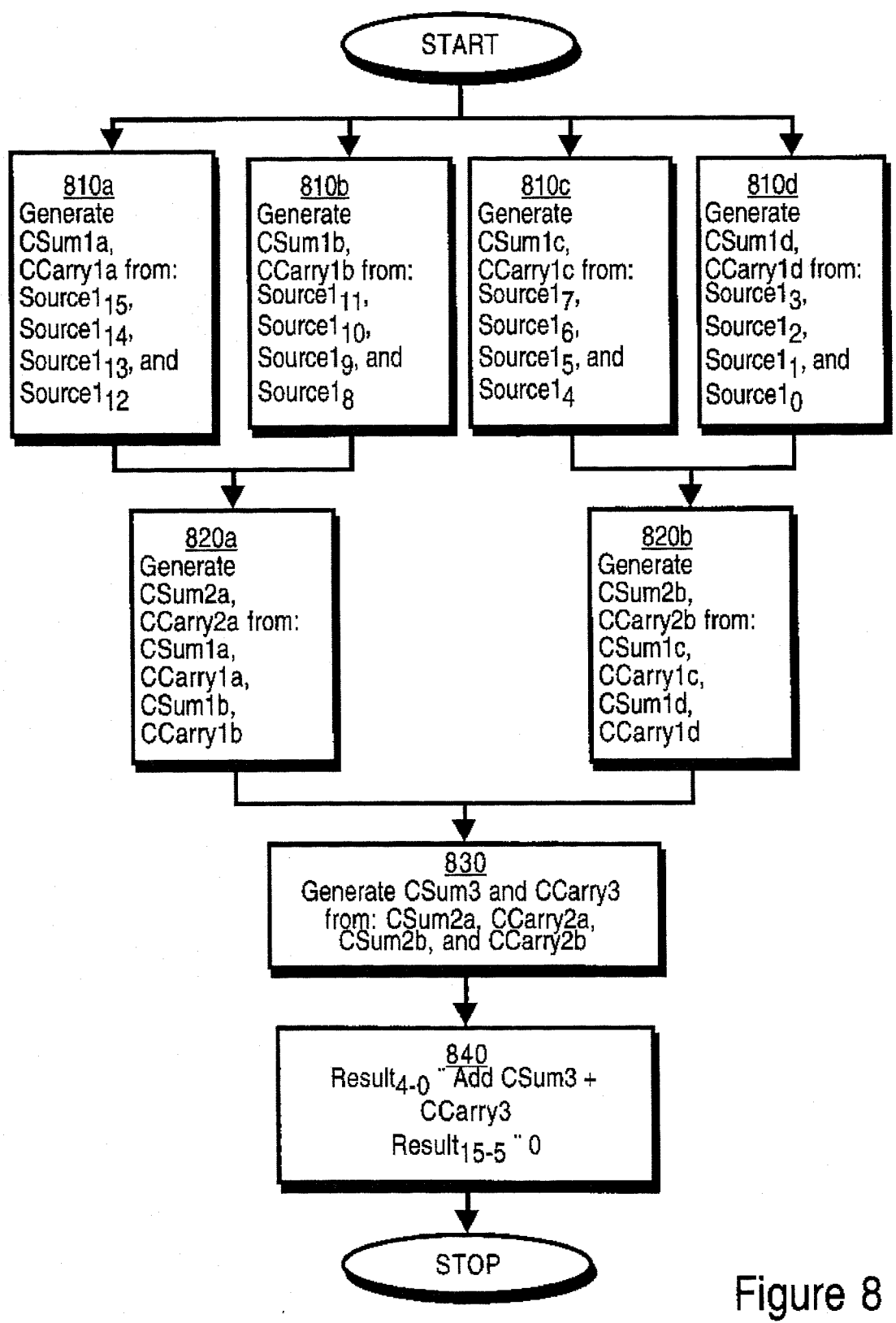
FIG. 8 illustrates the steps followed when performing a population count operation on one data element of a packed data and generating a single result data element for a result packed data.

FIG. 8 illustrates the steps followed when performing a population count operation on one data element of a packed data and generating a single result data element for a result packed data. At step 810a, a column sum, CSum1a, and a column carry, CCarry1a, are generated from Source1 bits fifteen, fourteen, thirteen and twelve. At step 810b, a column sum, CSum1b, and a column carry, CCarry1b, are generated from Source1 bits eleven, ten, nine and eight. At step 810c, a column sum, CSum1c, and a column carry, CCarry1c, are generated from Source1 bits seven, six, five and four. At step 810d, a column sum, CSum1d, and a column carry, CCarry1d, are generated from Source1 bits three, two, one and zero. In one embodiment of the present invention, steps 810a–d are performed in parallel. At step 820a, a column sum, CSum2a, and a column carry, CCarry2b, are generated from CSum1a, CCarry1a, CSum1b, and CCarry1b. At step 820b, a column sum, CSum2b, and a column carry, CCarry2b, are generated from CSum1c, CCarry1, CSum1d, and CCarry1d. In one embodiment of the present invention, steps 820a–b are performed in parallel. At step 830, a column sum, CSum3, and a column carry, CCarry3, are generated from CSum2a, CCarry2a, CSum2b, and CCarry2b. At step 840, a Result is generated from CSum3 and CCarry3. In one embodiment, the Result is represented in sixteen bits. In this embodiment, as only bit four through bit zero are need to represent the maximum number of bits set in a Source1, bits fifteen through five are set to zero. The maximum number of bits for Source1 is sixteen. This occurs when Source1 equals $1111111111111111_2$. The Result would be sixteen and would be represented by $0000000000010000_2$.

Thus, to calculate four result data elements for a population count operation on a sixty-four bit packed data, the steps of FIG. 8 would be performed for each data element in the packed data. In one embodiment, the four sixteen bit result data elements would be calculated in parallel.

A CIRCUIT FOR PERFORMING A POPULATION COUNT

Figure 9:
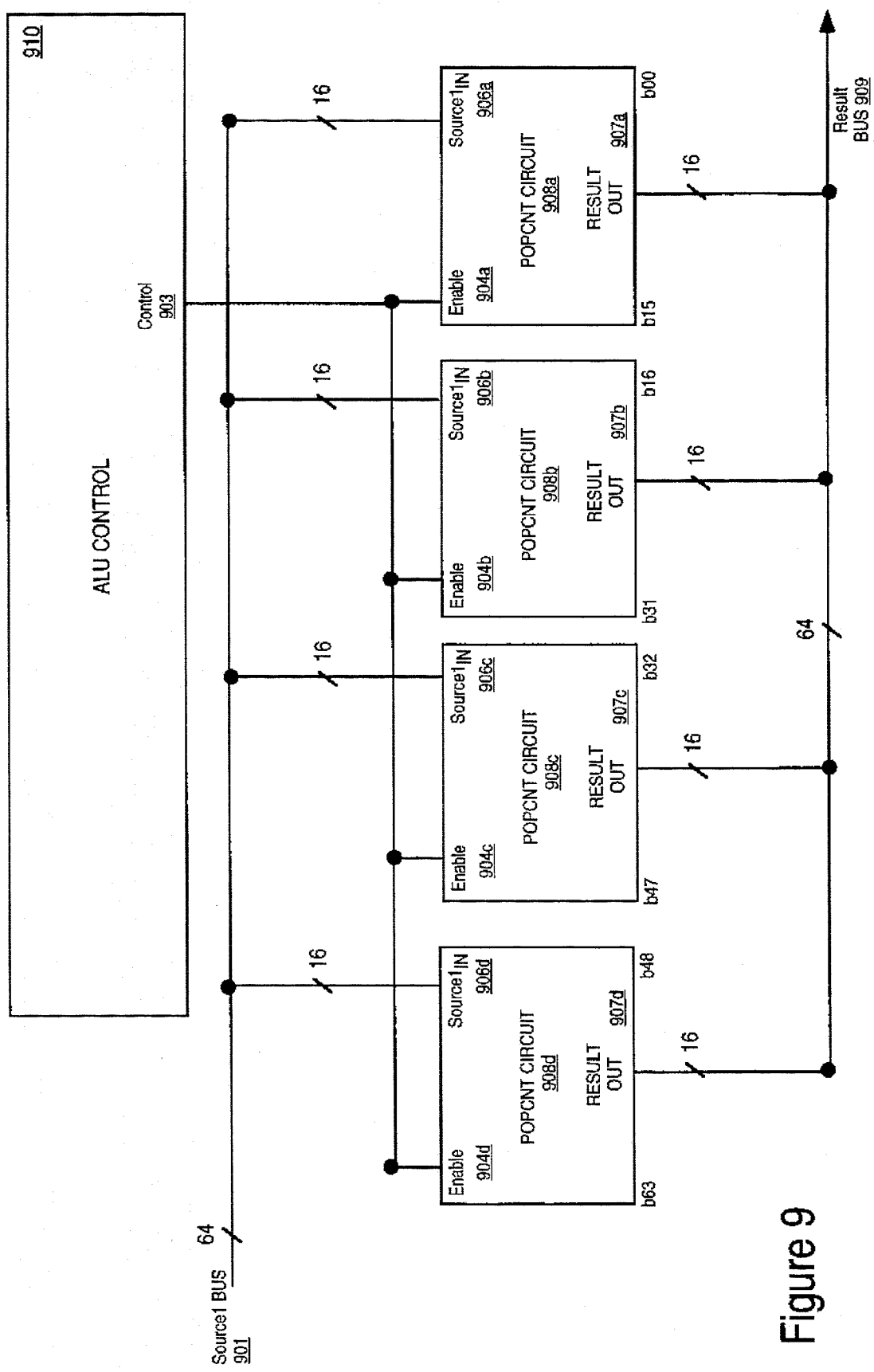
FIG. 9 illustrates one circuit for performing a population count operation on packed data having four word data elements.
Figure 10:
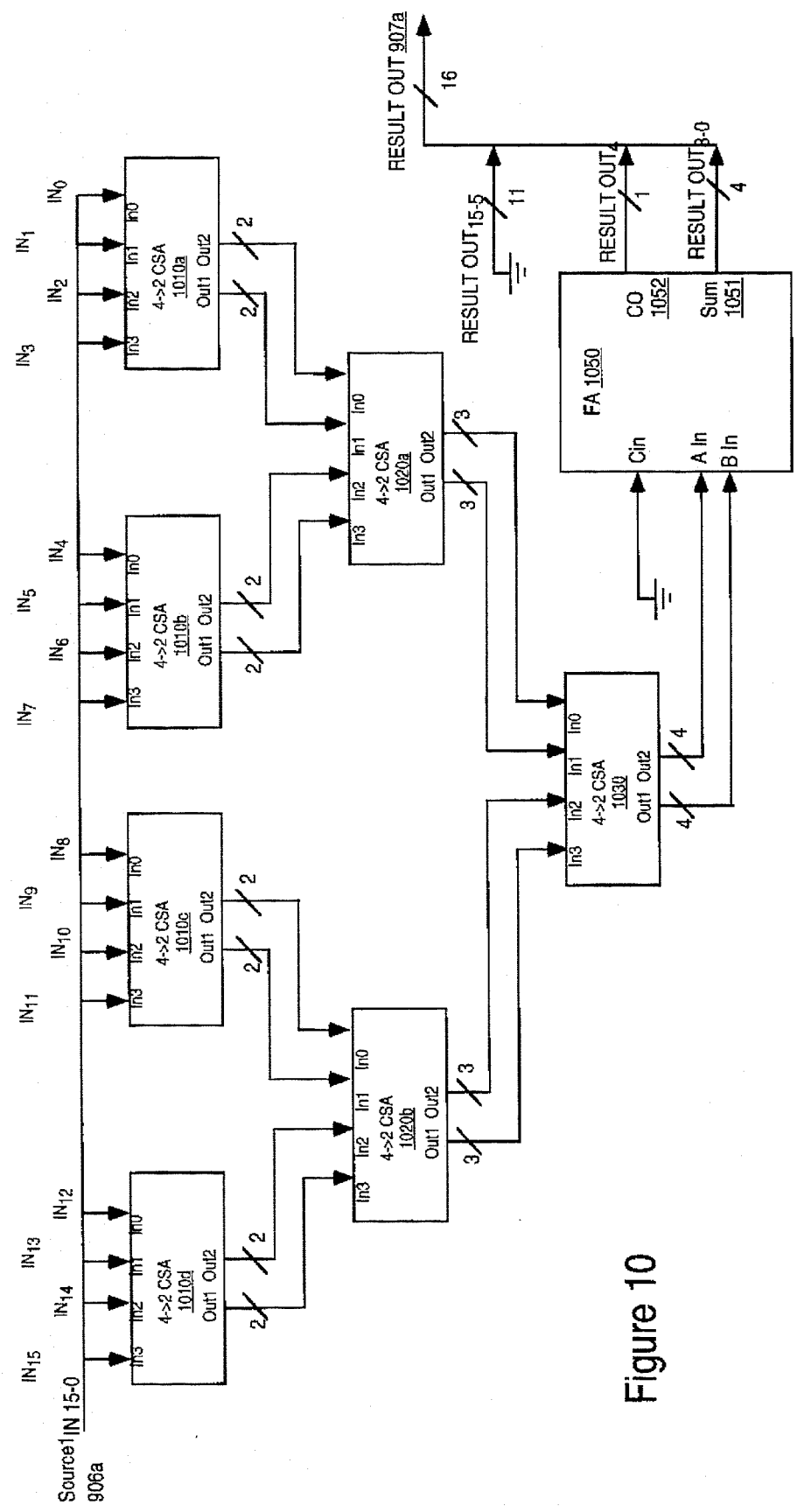
FIG. 10 illustrates a detailed circuit for performing a population count operation on one word data element of a packed data.

The preferred embodiment of the present invention employs numerous circuits to implement the invention. FIG. 9 illustrates one circuit for performing a population count operation on a packed data having four word data elements. FIG. 10 illustrates a detailed circuit for performing a population count operation on one word data element of a packed data.

FIG. 9 illustrates a circuit wherein Source1 bus 901 carries information signals to the popcnt circuits 908a–d via Source1 IN 906a–d. Thus, popcnt circuit 908a totals the number of bits set in bit fifteen through bit zero of Source1, producing bit fifteen through bit zero of Result. Popcnt circuit 908b totals the number of bits set in bit thirty-one through bit sixteen of Source1, producing bit thirty-one through bit sixteen of Result. Popcnt circuit 908c totals the number of bits set in bit forty-seven through bit thirty-two of Source1, producing bit forty-seven through bit thirty-two of Result. Popcnt circuit 908d totals the number of bits set in bit sixty-three through bit forty-eight of Source1, producing bit sixty-three through bit forty-eight of Result. Enable 904a–d receives, from ALU 910, via control 903, control signals enabling popcnt circuits 908a–d to perform population count operations, and to place a Result on the Result Bus 909. One skilled in the art would be able to create such a circuit given the illustrations in FIGS. 1–9 and the above description.

Popcnt circuits 908a–d communicate result information of a packed population count operation onto Result bus 909, via result out 907a–d. This result information is then stored in the integer register specified by the DEST 605 register address.

A CIRCUIT FOR PERFORMING A POPULATION COUNT ON ONE DATA ELEMENT

FIG. 10 illustrates a detailed circuit for performing a population count operation on one, word, data element of a packed data. In particular, FIG. 10 illustrates a portion of popcnt circuit 908a. To achieve the maximum performance for applications employing a population count operation, the operation should be complete within one clock cycle. Therefore, given that accessing a register and storing a result requires a certain percentage of the clock cycle, the circuit of FIG. 9 completes its operation within approximately 80% of one clock period. This circuit has the advantage of allowing processor 109 to execute a population count operation on four sixteen bit data elements in one clock cycle.

Popcnt circuit 908a employs 4→2 carry-save adders (unless otherwise specified, CSA will refer to a 4→2 carry-save adder). 4→2 carry-save adders, as may be employed in the popcnt circuit 908a–d, are well known in the art. A 4→2 carry-save adder is an adder that adds four operands, resulting in two sums. Since the population count operation in popcnt circuit 908a involves sixteen bits, the first level includes four 4→2 carry-save adders. These four 4→2 carry-save adders transform the sixteen one-bit operands into eight two-bit sums. The second level transforms the eight two-bit sums into four three-bit sums, and the third level transforms the four three-bit sums into two four-bit sums. Then a four-bit full adder, adds the two four-bit sums to generate a final result.

Although 4→2 carry-save adders are used, an alternative embodiments could employ 3→2 carry-save adders. Alternatively, a number of full adders could be used; however, this configuration would not provide a result as quickly as the embodiment shown in FIG. 10.

Source1$_{IN\ 15-0}$ 906a carries bit fifteen through bit zero of Source1. The first four bits are coupled to the inputs of a 4→2 carry-save adder (CSA 1010a). The next four bits are coupled to the inputs of CSA 1010b. The next four bits are coupled to the inputs of CSA 1010c. The final four bits are coupled to the inputs of CSA 1010d. Each CSA 1010a–d generates two, two-bit, outputs. The two, two bit, outputs of CSA 1010a are coupled to two inputs of CSA 1020a. The two, two bit, outputs of CSA 1010b are coupled to the other two inputs of CSA 1020a. The two, two bit outputs of CSA 1010c are coupled to two inputs of CSA 1020b. The two, two bit outputs of CSA 1010d are coupled to the other two inputs of CSA 1020b. Each CSA 1020a–b generates two, three bit, outputs. The two, three bit, outputs of 1020a are coupled to two inputs of CSA 1030. The two, three bit, outputs of 1020b are coupled to the other two inputs of CSA 1030. CSA 1030 generates two, four bit, outputs.

These two four bit outputs are coupled to two inputs of a full adder (FA 1050). FA 1050 adds the two four bit inputs and communicates bit three through bit zero of Result Out 907a as a total of the addition of the two, four bit, inputs. FA 1050 generates bit four of Result Out 907a through carry out (CO 1052). In an alternative embodiment, a five bit full adder is used to generate bit four through bit zero of Result Out 907a. In either case, bit fifteen through bit five of Result Out 907a are tied to zero. As well, any carry inputs to the full adder are tied to zero.

Although not shown in FIG. 10, one skilled in the art would understand that Result Out 907a could be multiplexed or buffered onto Result bus 909. The multiplexor would be controlled by Enable 904a. This would allow other ALU circuits to write data onto Result bus 909.

Thus, an apparatus and method of increasing processor performance by efficiently reducing the difference between data element length and actual carrying and storage capacity has been described. In particular, a circuit capable of performing population count operations on packed data has been described.

What is claimed is:

1. A circuit for producing a population count for a data element comprising:

a first set of adders comprising first, second, third, and fourth carry-save adders coupled to receive first, second, third, and fourth bit portions of the first data element, respectively, the first and second carry save adders producing a first multi-bit output, and the third and fourth carry save adders producing a second multi-bit output;

a second set of adders comprising fifth and sixth carry-save adders coupled to receive the first and second multi-bit outputs, respectively, the fifth and sixth carry-save adders producing a third multi-bit output;

a seventh carry-save adder coupled to receive the third multi-bit output, the seventh carry-save adder producing a fourth multi-bit output; and a full adder coupled to receive the fourth multi-bit output and produce the population count therefrom.

2. The operation circuit of claim 1 wherein each of the carry-save adders is a 4→2 carry-save adder.

3. The operation circuit of claim 2 wherein the full adder is a four-bit full adder, the full adder being for generating a carry-out.

4. A circuit having a packed data input and a packed data result output, said circuit comprising:

a first circuit having a first data element input and a first data element result output, said packed data input coupled to receive a first packed data, said first packed data including a first data element and a second data element, said first data element corresponding to bit fifteen through bit zero of said first packed data, said first data element input coupled to receive said first data element, said first circuit further having:

a first carry-save adder being coupled to receive bit three through bit zero of said first packed data, said first carry-save adder for generating a first two-bit output and a second two-bit output;

a second carry-save adder being coupled to receive bit seven through bit four of said first packed data, said second carry-save adder for generating a third two-bit output and a fourth two-bit output;

a third carry-save adder being coupled to receive bit eleven through bit eight of said first packed data, said third carry-save adder for generating a fifth two-bit output and a sixth two-bit output;

a fourth carry save adder being coupled to receive bit fifteen through bit twelve of said first packed data, said fourth carry-save adder for generating a seventh two-bit output and an eighth two-bit output;

a fifth carry-save adder being coupled to receive said first, second, third, and fourth two-bit outputs, said fifth carry-save adder for generating a first three-bit output and a second three-bit output;

a sixth carry-save adder being coupled to receive said fifth, sixth, seventh, and eighth two-bit outputs, said sixth carry-save adder for generating a third three-bit output and a fourth three bit output;

a seventh carry-save adder being coupled to receive said first, second, third, and fourth three-bit outputs, said seventh carry-save adder for generating a first four-bit output and a second four-bit output; and a full adder being coupled to receive said first and second four-bit outputs, said full adder for generating bit four through bit zero of said result packed data, and said bit fifteen through bit five of said result packed data being coupled to ground;

a second circuit having a second data element input and a second result data element output, said second data element input being coupled to receive said second data element; and wherein said first result data element output and said second result data element output are coupled to said result packed data output.

5. The circuit of claim 4 wherein each of said carry-save adders is a 4→2 carry-save adder.

* * * * *

UNITED STATES PATENT AND TRADEMARK OFFICE
CERTIFICATE OF CORRECTION

PATENT NO. : 5,541,865
DATED : July 30, 1996
INVENTOR(S) : Yaron Ashkenazi

It is certified that error appears in the above-indentified patent and that said Letters Patent is hereby corrected as shown below:

In column 5 at line 43 delete "carded" and insert --carried--

In column 8 at line 45 delete "an" and insert --art--

In column 11 at line 60 delete "an" and insert --art--

Signed and Sealed this

Twenty-third Day of September, 1997

Attest:

BRUCE LEHMAN

Attesting Officer

Commissioner of Patents and Trademarks